United States Patent Office 3,257,354
Patented June 21, 1966

3,257,354
METHOD OF STABILIZATION OF RUBBER WITH A SUBSTITUTED TRIAZINE AND COMPOSITIONS STABILIZED THEREBY
Martin Dexter, White Plains, Martin Knell, Stillwater Hills, Ossining, and Eric A. Roskin, Bronx, N.Y., assignors to Geigy Chemical Corporation, Ardsley, N.Y., a corporation of Delaware
No Drawing. Original application Apr. 11, 1961, Ser. No. 99,663. Divided and this application Oct. 25, 1962, Ser. No. 242,571
3 Claims. (Cl. 260—45.8)

This application is a divisional application of copending application Serial No. 99,663, filed April 11, 1961, now abandoned. Application Serial No. 99,663 is in turn a continuation-in-part of copending application Serial No. 21,604, filed on April 12, 1960, now abandoned, and also a continuation-in-part of copending application Serial No. 87,521, filed February 21, 1961, now abandoned.

This invention relates to a method of stabilization of rubber with a substituted triazine and to compositions stabilized thereby.

In one aspect of the invention, rubber is stabilized with compounds of the formula:

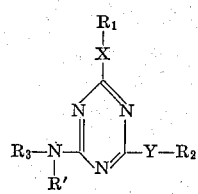

wherein $R_1$ and $R_2$ each independently represents alkyl having from 1 to 18 carbon atoms, e.g., methyl, ethyl, propyl, butyl, octyl, dodecyl, octadecyl, etc.;

$R_3$ represents alkylhydroxyphenyl, preferably having from 7 to 24 carbon atoms, e.g., methylhydroxyphenyl, ethylhydroxyphenyl, propylhydroxyphenyl, butylhydroxyphenyl, octylhydroxyphenyl, dodecylhydroxyphenyl, octadecylhydroxyphenyl, dimethylhydroxyphenyl, dibutylhydroxyphenyl, dioctylhydroxyphenyl, dibutylmethylhydroxyphenyl, etc.;

$R'$ is alkanoyl, preferably having from 1 to 12 carbon atoms; and

X and Y each independently represents —S—, —O— or —NR$_4$—, wherein $R_4$ is aralkyl, preferably benzyl, alkyl, preferably lower alkyl, or hydrogen.

In this aspect of the invention, rubber is stabilized preferably with compounds of the general formula:

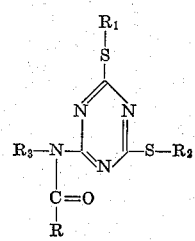

wherein $R_1$ and $R_2$ each independently represents alkyl having from 1 to 18 carbon atoms, e.g., methyl, ethyl, propyl, butyl, octyl, dodecyl, octadecyl, etc.;

$R_3$ represents alkylhydroxyphenyl, preferably having from 7 to 24 carbon atoms, e.g., methylhydroxyphenyl, ethylhydroxyphenyl, propylhydroxyphenyl, butylhydroxyphenyl, octylhydroxyphenyl, dodecylhydroxyphenyl, octadecylhydroxyphenyl, dimethylhydroxyphenyl, dibutylhydroxyphenyl, dioctylhydroxyphenyl, dibutylmethylhydroxyphenyl, etc; and R is an alkyl radical, preferably having from 1 to 11 carbon atoms, e.g. methyl, ethyl, propyl, butyl, pentyl, hexyl, heptyl, nonyl, decyl, undecyl, etc.

In this specification, the term "lower alkyl" signifies an alkyl group having from 1 to 6 carbon atoms, and "aryl" embraces within its meaning not merely carbocyclic, e.g., phenyl, naphthyl, etc., but also heterocyclic radicals, e.g., pyridyl, thiazolyl, etc.

Up to the present time, the use of the substituted triazines of the invention in stabilizing rubber, e.g. artifical rubber, such as polyisoprene or styrene-butadiene rubber, has not been known. It has now surprisingly been found that such materials are stabilized, e.g., against oxidative deterioration, by incorporating therein effective quantities of one of the substituted triazines defined according to the present invention.

Accordingly, it is a prime object of the invention to provide stable rubber, preferably stable artificial rubber, e.g., polyisoprene. Other examples of rubber stabilized according to the invention include styrene-butadiene rubber, polybutadiene rubber, butyl rubber, nitrile rubber, neoprene rubber and natural rubber alone, blends of artificial rubber and natural rubber, such as e.g. natural rubber and polybutadiene rubber. In fact, any rubber subject to degradation by atmospheric oxygen is within the scope of the present invention. Artificial rubber, however, is preferred.

It is a further object of the invention to provide a method for stabilizing rubber, particularly artificial rubber and blends thereof with natural rubber, by incorporating in said rubber a stabilizing amount of a triazine compound according to the invention.

It is understood that the stabilizers of the invention are not necessarily of equivalent potency. The specific stabilizer most useful to a given unstable rubber will depend upon several factors for its advantages. Availability and cost of raw materials for the manufacture of the stabilizer and effective inhibitory action of the stabilizer, including duration and degree of activity, are among the factors which control the choice of a specific stabilizer for a specific rubber substrate which is normally subject to deterioration. Toxicity, color, stability to light and/or heat and solubility are also important factors. For example, a preferred composition according to the invention comprises from about 0.001% to about 5% by weight of 6-(4-hydroxy - 3,5-di-t-butylanilino) - 2,4-bis-(n-octylthio)-1,3,5-triazine and polyisoprene.

In general, stabilizers of the invention are employed in a concentration of from about 0.001% to about 5% by weight, preferably from about 0.01% to about 1% by weight. The specific concentration used varies with the unstabilized rubber substrate and the specific stabilizer, as noted above. When mixtures of two or more stabilizers are employed in rubber, usually the total amount of added stabilizers will not exceed 10% of the total stabilized rubber.

When the triazine stabilizers disclosed herein are used to stabilize rubber in combination with other additive agents, it is contemplated that there may be added, for example, antioxidants, carbon black, accelerators and other chemicals used in rubber compounding, plasticizers, color stabilizers, heat stabilizers, UV absorbers, dyes and pigments, etc.

The compounds of the present invention are advantageously prepared, for example, according to the following reactions, wherein R represents the same or different radicals as defined hereinbelow (the said R radicals corresponding to the previously mentioned $R_1$, $R_2$, $R_3$, etc.):

(A)

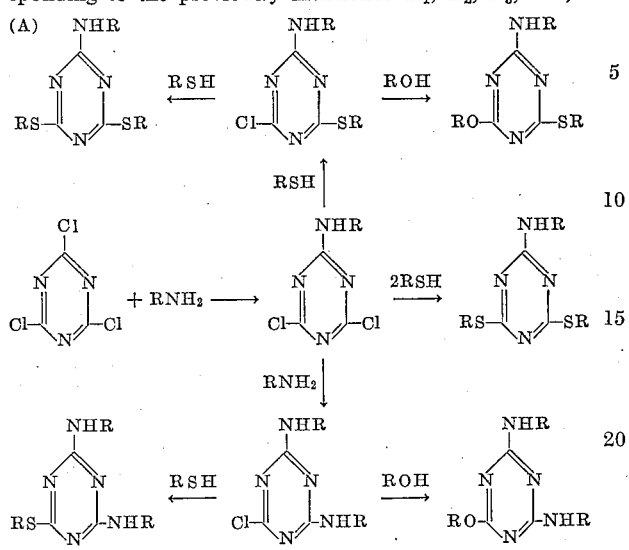

(E)

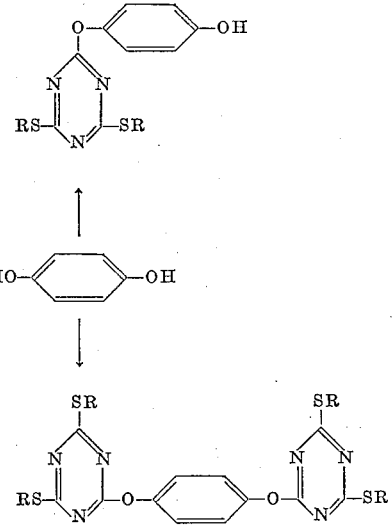

(B)

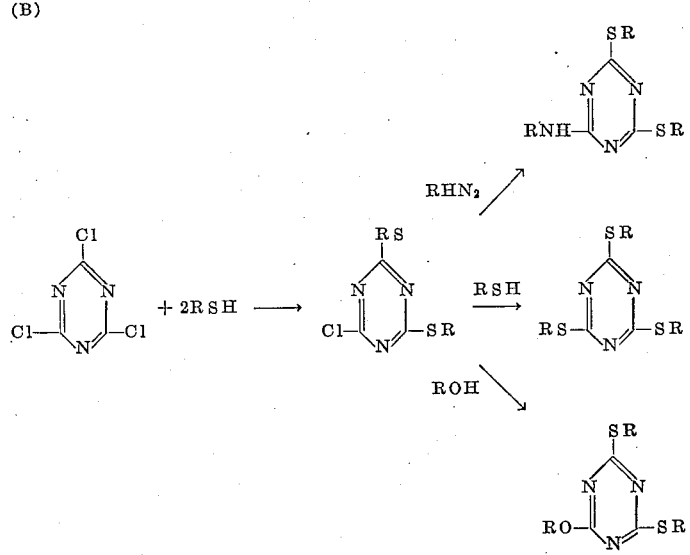

(C)

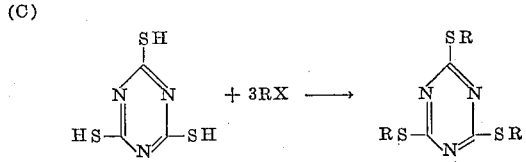

(D)

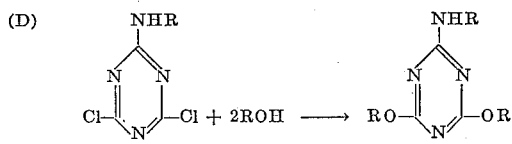

In the foregoing scheme of reactions, it is understood that, while cyanuric chloride is a preferred starting material, other triazine compounds having reactive groups other than halogen may be used. Likewise, any combination of the methods outlined in A, B, C, D, and E may be employed to attain the desired variant compound within the scope of the invention.

In the foregoing scheme also, the "H" of ROH and RSH may be replaced by a suitable reactive group or atom, as e.g. an alkali metal, such as sodium, potassium, etc., or the ammonium radical. In the case of the imino group, hydrogen may be replaced by alkyl, benzyl, etc. Also, X represents halogen, e.g., chlorine.

For reaction with a suitable triazine, the amines, mercaptans and halides of the formulae RNH₂, RSH and RX are useful. The halide may be any suitable halide, as e.g. a fluoride, iodide, bromide and, preferably, a chloride. The R group is advantageously an alkyl group having from 1 to 18 carbon atoms, e.g., methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. R is also advantageously a cycloalkyl group, e.g., cyclopentyl and cyclohexyl. In other aspects R is aryl, e.g., phenyl, hydroxyaryl, e.g. hydroxyphenyl, alkylaryl, e.g., alkylphenyl having from 7 to 24 carbon atoms, such as tolyl, ethylphenyl, propyphenyl, butylphenyl, octylphenyl, octadecylphenyl, etc.; alkylhydroxyaryl, e.g. alkylhydroxyphenyl, such as methylhydroxyphenyl, dimethylhydroxyphenyl, trimethylhydroxyphenyl, tetramethylhydroxyphenyl, ethylhydroxyphenyl, diethylhydroxyphenyl, triethylhydroxyphenyl, tetraethylhydroxyphenyl, propylhydroxyphenyl, dipropylhydroxyphenyl, butylhydroxyphenyl, dibutylhydroxyphenyl, octylhydroxyphenyl, dioctylhydroxyphenyl, octadecylhydroxyphenyl, etc.

Another useful class of R groups comprises the alkylthioalkyls, such as methylthiomethyl, methylthioethyl, methylthiopropyl, methylthiobutyl, methylthiopentyl, etc. also ethylthiopentyl, etc., propylthiomethyl, propylthioethyl, propylthiopropyl, propylthiobutyl, propylthiopentyl, etc., butylthiomethyl, butylthioethyl, butylthiopropyl, butylthiobutyl, butylthiopentyl, etc., pentylthiomethyl, pentylthioethyl, pentylthiopropyl, etc., hexylthiomethyl, hexylthioethyl, hexylthiopropyl, etc., heptylthiomethyl, heptylthioethyl, hepthylthiopropyl, octylthiomethyl, octylthioethyl, etc.

Other useful R groups comprise benzyl, hydroxybenzyl and alkylhydroxybenzyl, e.g. methylhydroxybenzyl, ethylhydroxybenzyl, propylhydroxybenzyl, butylhydroxybenzyl, octylhydroxybenzyl, etc.; cyanoalkyl, e.g. cyanomethyl, cyanoethyl, cyanopropyl, cyanobutyl, cyanopentyl, cyanohexyl, etc.; carbalkoxyalkyl, e.g. carbomethoxymethyl, carbethoxyethyl, carbopropoxyethyl, carbododecanoxyethyl, etc.; carbalkoxyphenyl, e.g. carbomethoxyphenyl, carbethoxyphenyl, carbopropoxyphenyl, carbododecanoxyphenyl, etc.

The following examples are illustrative of the invention, but by no means is the invention limited thereto. In all examples parts are by weight unless otherwise noted, and the relationship between parts by weight and parts by volume is as that of grams to cubic centimeters. The temperature is in degrees Centigrade.

*Example 1.—6-(4-hydroxy-3,5-di-t-butylanilino)2,4-bis-(n-octylthio)-1,3,5-triazine*

(a) *4-nitroso-2,6-di-t-butylphenol.*—750 parts by volume of ethanol, cooled to 15°, are saturated with hydrogen chloride gas and then diluted by the addition of 4000 parts by volume of ethanol. 2,6-di-t-butylphenol (824 parts) is dissolved in the alcoholic solution and a solution of sodium nitrite (304 parts in 400 parts by volume of water) is added at 15–20° over a period of one hour while stirring. Stirring is continued for another 2 hours while allowing the temperature to rise to room temperature. 2000 parts by volume of water are added and the product is then separated by filtration and washed well with water. The filter cake is slurried in 3000 parts by volume of petroleum ether, filtered, washed on the filter with 1000 parts by volume of petroleum ether and dried in a vacuum oven at 70–80°. The yield of 4-nitroso-2,6-di-t-butylphenol, melting at 219°, is 848 parts (90.2%).

(b) *4-amino-2,6-di-t-butylphenol.*—4 - nitroso-2,6-di-t-butylphenol (176 parts) is dissolved in 600 parts by volume of 5 N sodium hydroxide and 1200 parts by volume of water, and a solution of sodium hydrosulfite (522 parts) in 2200 parts by volume of water is added with moderate speed (about 30 minutes), during which time the temperature rises to 53°. After the addition is completed, stirring is continued for 2½ hours after which the product is filtered rapidly, washed with 4000 parts by volume of water and dried in a vacuum desiccator over phosphoric anhydride. The yield of 4-amino-2,6-di-t-butylphenol, melting at 105–108° is 162.3 parts (98.5%).

(c) *6 - (4 - hydroxy-3,5-di-t-butylanilino)-2,4-dichloro-1,3,5-triazine.*—A solution of cyanuric chloride (18.4 parts) in boiling acetone (100 parts by volume) is poured in a thin stream while stirring into 200 parts by volume of ice-water, keeping the temperature at 0–5° with external cooling. 4-amino-2,6-di-t-butylphenol (22.1 parts) and sodium carbonate (5.3 parts) are added and the reaction mixture is stirred vigorously at 8–10° for 45 minutes. The mixture is then diluted by the addition of 100 parts by volume of acetone and stirring is continued for an additional hour at 8–10°. The suspension is then poured into 500 parts by volume of ice-water, the precipitate is filtered off and dried in vacuo. The yield of 6-(4-hydroxy-3,5-di-t-butylanilino)-2,4-dichloro-1,3,5 - triazine is 34.8 parts (94%). The product melts at 144°.

(d) *6 - (4 - hydroxy - 3,5 - di - t - butylanilino) - 2,4-bis-(n-octylthio)-1,3,5-triazine.*—An alcoholic solution of sodium n-octylmercaptide (prepared by dissolving 2.3 parts of sodium in 50 parts by volume of ethanol and adding 14.6 parts of n-octylmercaptan) is added rapidly with stirring to a solution of 18.5 parts of 6-(4-hydroxy-3,5-di-t-butylanilino)-2,4-dichloro-1,3,5-triazine in 150 parts by volume of ethanol. The reaction mixture is stirred and refluxed for 1½ hours. After cooling to room temperature, 500 parts by volume of water are added. The precipitated product is separated by filtration and washed well with water. Purification of the product is accomplished by dissolving in 300 parts by volume of boiling ethanol, adding activated carbon, filtering and slowly recrystallizing. The 6 - (4-hydroxy-3,5-di-t-butylanilino)-2,4-bis-(n-octylthio)-1,3,5-triazine, which crystallizes as white needles, is filtered off, washed with cold ethanol and is dried in vacuo yielding 10.6 parts melting at 92–95°. Additional 8.6 parts having the same melting point are obtained by concentration of the mother liquor. The total yield is 65.5% of the theoretical yield.

*Example 2.—6-(N-acetyl-4-hydroxy-3,5-di-t-butylanilino) 2,4-bis-(n-octylthio)-1,3,5-triazine*

23.5 parts of 6-(4-hydroxy-3,5-di-t-butylanilino)-2,4-bis-(n-octylthio)-1,3,5-triazine and 200 parts by volume of acetic anhydride are heated at 130° for 2½ hours, after which the volatile materials are stripped from the reaction mixture under high vacuum (0.05 mm. Hg) at water bath temperature. The viscous lemon colored liquid which remains in the distillation pot is dissolved in 150 parts by volume of ether, washed with 10% (by weight) sodium bicarbonate solution, and then washed with water and finally dried over anhydrous magnesium sulfate. Thereafter, the ether is removed by evaporation on the steam bath and the residue is finally stripped at 130° and 0.05 mm. Hg. The so-obtained product weighs 22.5 parts. This product, 6-(N-acetyl-4-hydroxy-3,5-di-t-butylanilino)-2,4-bis-(n-octylthio)-1,3,5-triazine, has the following analysis:

Calculated for $C_{35}H_{58}N_4O_2S_2$: C, 66.6%; H, 9.27%; N, 8.88%. Found: C, 66.52%; H, 9.09%; N, 8.99%.

If in Example 2, valeric anhydride is substituted for acetic anhydride, then 6-(N-valeroyl-4-hydroxy-3,5-di-t-butylanilino)-2,4-bis-(n-octylthio) - 1,3,5 - triazine is obtained.

Further, if in Example 2, lauric anhydride is substituted for acetic anhydride, then 6-(N-lauroyl-4-hydroxy-3,5-di-t-butylanilino)-2,4-bis-(n-octylthio)-1,3,5 - triazine is obtained.

Example 3

Stablized rubber is prepared by mixing in the cold:

|  | Parts |
|---|---|
| Hevea latex crepe | 100.0 |
| Stearic acid | 1.5 |
| Zinc oxide | 5.0 |
| Diphenylguanidine | 1.0 |
| Sulfur | 2.5 |
| 6-(4-hydroxy-3,5-di-t-butylanilino) - 2,4 - bis - (n-octylthio)-1,3,5-triazine | 1.0 |

The resultant mixture is vulcanized at 140° and tested according to ASTM D–1206–52T. The time required to elongate a test strip from 120 mm. to 170 mm. is 10 hours for the unstabilized rubber and 17 hours for the stabilized rubber. In a similar way, styrene-butadiene rubber is stabilized. In a similar way also, a blend of natural rubber (50 parts) and polybutadiene rubber (50 parts) is stabilized.

In like manner as in the foregoing Example 3, stable compositions of natural rubber are prepared having 0.9% by weight of the following compounds:

6-(4-hydroxy-3,5-di-t-butylanilino-N-acetyl)-2,4-bis-(n-octylthio)-1,3,5-triazine  (Ex. 2)

6-(N-valeroyl-4-hydroxy-3,5-di-t-butylanilino)-2,4-bis-(n-octylthio)-1,3,5-triazine  (Ex. 2)

6-(N-lauroyl-4-hydroxy-3,5-di-t-butylanilino)-2,4-bis-(n-octylthio)-1,3,5-triazine  (Ex. 2)

What is claimed is:

1. Method of stabilizing rubber selected from the group consisting of conjugated diene rubber, butyl rubber and nitrile rubber which comprises incorporating therein a stabilizing amount of a stabilizer, said stabilizer being a compound of the formula

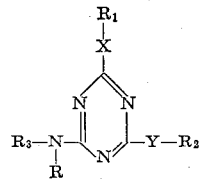

wherein $R_1$ and $R_2$ are each an alkyl group having from 1 to 18 carbon atoms;

$R_3$ is an alkylhydroxyphenyl group;

R is alkanoyl having from 1 to 12 carbon atoms;

and X and Y are each independently selected from the group consisting of —S—, —O— and —$NR_4$—, wherein $R_4$ is aralkyl.

2. Stabilized composition of matter which comprises rubber selected from the group consisting of conjugated diene rubber, butyl rubber and nitrile rubber and a stabilizing amount of a stabilizer as defined in claim 1.

3. Stabilized composition of matter which comprises rubber selected from the group consisting of conjugated diene rubber, butyl rubber and nitrile rubber and from about 0.001% to about 5% by weight of a stabilizer as defined in claim 1.

No references cited.

LEON J. BERCOVITZ, *Primary Examiner.*

H. E. TAYLOR, JR., *Assistant Examiner.*